United States Patent Office 2,780,626
Patented Feb. 5, 1957

2,780,626
2,6-ALKYLPYRIDINES

Herbert C. Brown, Lafayette, Ind., and Bernard Kanner, Detroit, Mich., assignors to Research Corporation, New York, N. Y., a corporation of New York No Drawing. Application August 13, 1953,
Serial No. 374,121

7 Claims. (Cl. 260—290)

This invention relates to 2,6-dialkyl-substituted pyridines, and is more particularly concerned with 2,6-secondary- and tertiary-alkyl-substituted pyridines having the following formula:

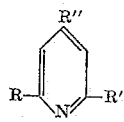

wherein R and R' are secondary- and tertiary-alkyl radicals containing from three to eleven carbon atoms, and R'' is hydrogen or an alkyl radical containing up to 18 carbon atoms, inclusive.

The novel compounds of the present invention do not dehydrohalogenate alkyl halides, but do neutralize hydrogen chloride. As such, they are excellent additives for stabilizing chlorine-containing polymers, for example, polyvinylchloride, wherein they will neutralize traces of hydrochloric acid formed by time decomposition, without themselves catalyzing the decomposition of the polymers. They are also valuable, in addition, as additives to lubricating oils and gasoline. Apparently, the presence of the bulky group in the 2- and 6-positions of the pyridine radical causes the material to be relatively inert toward displacement or addition reaction involving atoms significantly larger than a proton. As such, the materials are highly useful as proton getters. In fact, when the materials of the present invention are treated with a mixture of boron trifluoride and hydrogen chloride, only the hydrogen chloride reacts with the substituted pyridines of the present invention, even though the boron trifluoride and hydrogen chloride have similar chemical and physical properties and would be difficult to separate by any other means.

The compounds of the present invention may be prepared by three general procedures, depending upon whether a di-secondary-alkylpyridine, a di-tertiary-alkyl-pyridine or 4-alkyl-2,6-bulky pyridine group is desired. In general, it is preferred, when di-secondary-alkyl-pyridines are prepared, to utilize a procedure which involves the reaction of 2,6-lutidine with sodium amide and an appropriate alkyl halide in liquid ammonia. The procedure may be roughly outlined as follows:

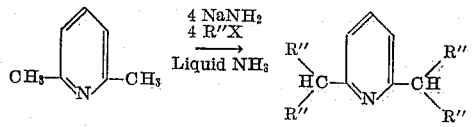

wherein R'' represents a lower-alkyl group containing from one to five carbon atoms. The reaction is normally conducted by preparing a mixture of sodium amide and liquid ammonia according to the procedure of Vaughan, Vogt and Nieuwland, Journal American Chemical Society, volume 56, 2120 (1934) and this suspension of sodium amide in liquid ammonia is then treated with 2,6-lutidine. The addition of the lutidine to the mixture is preferably carried out relatively slowly, to prevent the decomposition and heating up of the reaction mixture. After the mixture has been completed, an appropriate alkyl halide, such as, for example, methylchloride, methyl-bromide, methyliodide, ethylchloride, ethylbromide, ethyliodide, propylchloride, propylbromide, propyliodide, butylchloride, pentylchloride, pentylbromide, pentyl-iodide, et cetera, is introduced into the mixture over a period of time which will not allow a heating of the reaction mixture so that an excessive evaporation of the liquid ammonia results. After the alkyl halide has been added, the mixture is decomposed by the addition of an excess of water, and the aqueous mixture which results is extracted with ether until excess reagent has been removed. The ether is then removed, and the product dried over a suitable drying material and then subjected to rectification.

When it is desired to produce a mixture of a secondary- and tertiary-alkyl substituted pyridine, or, where a di-tertiary-alkyl material is to be prepared, an alkyl lithium procedure is preferably used. Following the procedure of Bartlett, Swain and Woodward, JACS 63, 3329 (1941) it is possible to prepare alkyl lithium materials suitable for reaction with an appropriate 2-substituted pyridine, having the following formula:

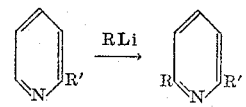

wherein R and R' have the hereinbefore given values. The condensation of an appropriate 2-alkylpyridine with the alkyl lithium is normally conducted by mixing the material with an appropriate solvent, such as purified petroleum ether, or other hydrocarbon material, cooling the reaction media to about the temperature of Dry Ice or a minus 78 degrees centigrade, or any temperature which will not allow the decomposition of the reactants before reaction, mixing the reactants and maintaining them at a cool temperature as above defined, for several hours. Upon heating the reaction mixture to reflux temperature, excess reagents will be decomposed and the desired dialkylpyridine may be separated in conventional manner, as by rectification.

When a 4-alkyl-2,6-di-secondary- or di-tertiary-alkyl pyridine is desired, a condensation according to the following diagram is desirably employed:

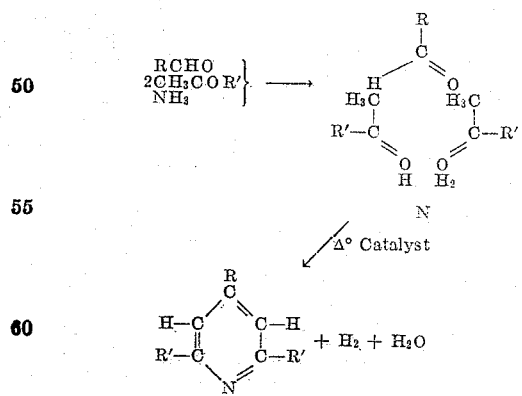

The reaction is usually conducted by heating an aldehyde containing from one to eighteen carbon atoms with a methyl ektone having a secondary- or tertiary-alkyl group containing three to eleven carbon atoms, inclusive, substituted on the carbonyl carbon in the presence of ammonia. Temperatures in excess of 200 degrees centigrade are satisfactory, however, above about 250 degrees centigrade is preferred. That point at which pyrolysis of the reactants or reaction product occurs serves as the maximum temperature which is suitable. A surface-active material is also preferably employed, representative materials which are satisfactory include, for example, alumina, kaolin, lime, silica gel, et cetera. Two mole equivalents of the methyl ketone are employed for each mole of aldehyde utilized. The ammonia is preferably anhydrous in order that the reaction will proceed as speedily as possible.

The following examples are given to illustrate certain procedures for preparing compounds of the present invention, but it is to be understood that said examples are not to be construed as limiting.

*Example 1.—2,6-diisopropylpyridine*

A one-liter, three-necked flask was equipped with a sealed Herschberg stirrer, a Dry Ice condenser, and a stopper. A metal pail with mica insulation was placed around the flask and about 700 milliliters of liquid ammonia was then added to said pail. The procedure of Vaughan et al., supra, was utilized to prepare sodium amide in liquid ammonia. To this suspension of sodium amide in liquid ammonia was then added 35.5 grams (0.33 mole) of 2,6-lutidine over a period of five minutes. After the addition had been completed, a second Dry Ice condenser was fitted to the third neck of the flask and 67.5 grams of methylchloride introduced through this condenser into the reaction mixture, the methylchloride requiring about five hours for its complete introduction. After evaporation of the liquid ammonia, 125 milliliters of water were added. The aqueous mixture was extracted seven times with 25-milliliter portions of ether, and the last ether extract showed that no more pyridine base was being extracted. The ether was removed by distillation, and the crude product dried over potassium hydroxide pellets. There was obtained 55 percent of the theoretical yield of 2,6-diisopropylpyridine having a boiling point of 194.1–194.5 degrees centigrade at 746 millimeters of mercury pressure absolute, a refractive index of $n_D^{20}$ of 1.480, a freezing point of 2.5 degrees centigrade and the melting point of its chloraurate salt is 167.0–167.2 degrees centigrade.

In a manner similar to that of the foregoing example, other secondary alkylpyridines may be prepared, such as, for example, the di-secondary-butylpyridine, 2,6-di-secondary-pentylpyridine, 2,6 - di - secondary-heptylpyridine, 2,6-di-secondary-octylpyridine, 2,6 - di - secondary-nonylpyridine, 2,6 - di - secondary-decylpyridine, 2,6-di-secondary-undecylpyridine, et cetera.

*Example 2.—2-isopropyl-6-tertiary-butylpyridine*

A three-necked flask was equipped with a sealed Herschberg stirrer, a 250-milliliter dropping funnel with a pressure equalizing side-arm and a gas outlet tube. A solution of 27 grams (0.2 mole) of 2-tertiary-butylpyridine in about 200 milliliters of anhydrous purified petroleum ether having a boiling point of 90–100 degrees centigrade introduced thereinto. The flask was cooled by Dry Ice and into it was introduced a cold solution of isopropyl lithium prepared by the method of Bartlett, Swain and Woodward, supra. The combined reactants were kept at minus 78 degrees centigrade and then allowed to warm to room temperature. The reaction mixture was heated to reflux temperature and maintained at reflux temperature for eight hours. Upon the addition of fifty milliliters of water, the active lithium materials were decomposed. The organic layer was decanted, stripped of solvents and dried over potassium hydroxide pellets. After rectification, there was obtained 24.7 grams (0.14 mole) of 2-isopropyl-6-tertiary-butylpyridine, boiling at 94 degrees centigrade at 23 millimeters of mercury pressure absolute. This corresponds to a yield of seventy percent of the theoretical. This material has a refractive index $n_D^{20}$ of 1.4753, and a freezing point of minus 66 degrees centigrade.

In a manner similar to that of the foregoing example, other secondary alkyl, tertiary-alkylpyridines may be prepared, for example, 2-isopropyl-6-tertiary-pentylpyridine, 2-isopentyl-6-tertiary-octylpyridine, 2-isopropyl-6-tertiary-undecylpyridine, 2 - secondary - nonyl - 6 - tertiary-heptyl-pyridine, 2-isohexyl-6-tertiary-heptylpyridine, et cetera.

*Example 3.—2,6-di-tertiary-butylpyridine*

Following the procedure of Bartlett, Swain and Woodward, supra, tertiary-butyl lithium was prepared from 46 grams of butylchloride and seven grams of lithium sand in about 200 milliliters of anhydrous ether. The tertiary butyl lithium solution was then reacted with 27 grams (0.2 mole) of 2-tertiary-butylpyridine in about 200 milliliters of purified petroleum ether having a boiling point between 90 and 100 degrees centigrade. The mixture was maintained at minus 78 degrees centigrade for several hours, and the solution then heated to reflux and the solvent stripped off until the reflux temperature reached seventy degrees centrigrade. After refluxing for seven hours at seventy degrees centigrade, the active lithium compounds were decomposed by the addition of fifty milliliters of water to the reaction mixture. The organic layer was decanted, dried over potassium hydroxide pellets and stripped of solvents. Upon rectification, there was obtained 18.8 grams (67 percent of the theoretical yield) of 2,6-di-tertiary-butylpyridine, having a boiling point of 100–101 degrees centigrade at 23 millimeters of mercury absolute. This material has a refractive index $n_D^{20}$ of 1.4733 and a freezing point of 2.2 degrees centigrade. The melting point of its chloraurate salt is 184.2–184.5 degrees centigrade.

In a manner similar to that of the foregoing example, other di-tertiary-alkylpyridines may be prepared, such as, for example, 2,6-di-tertiary-pentylpyridine, 2,6-di-tertiary-hexylpyridine, 2,6-di-tertiary-heptylpyridine, 2,6-di-tertiary-octylpyridine, 2,6-di-tertiary-nonylpyridine, 2,6-di-tertiary-decylpyridine, 2,6-di-tertiary-undecylpyridine, et cetera.

*Example 4.—4-methyl-2,6-di-tertiary-butylpyridine*

A mixture of 72 grams of acetaldehyde, 200 grams of tertiary butyl methyl ketone, 20 grams of ammonia and 100 grams of alumina is heated at 310 degrees centigrade under the reaction pressure of the mixture for two hours. Upon cooling, and separating the alumina and unreacted reactants, there is obtained 4-methyl-2,6-di-tertiary-butylpyridine.

In a manner similar to that of the above example, other alkyl aldehydes may be substituted for the acetaldehyde, such as, for example, propionaldehyde, n-butylaldehyde, isobutylaldehyde, n-valeraldehyde, et cetera, n-caproaldehyde, n-heptaldehyde, stearaldehyde, et cetera, to prepare other 4-alkyl-substituted pyridines. Additionally, other tertiary- or secondary-alkyl methyl ketones may be used instead of the tertiary-butyl methyl ketone of the example to prepare materials within the scope of the appended claims.

Various modifications may be made in the method and compounds of the present invention without departing from the spirit or scope thereof and it is to be understood that we limit ourselves only as defined in the appended claims.

We claim:

1. A compound having the formula:

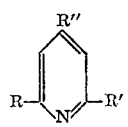

wherein R and R' are selected from the group consisting of secondary and tertiary alkyl groups containing from three to eleven carbon atoms, and wherein R'' is selected from the group consisting of hydrogen and alkyl groups groups containing up to 18 carbon atoms.

2. A compound having the formula:

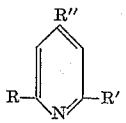

wherein R and R' are secondary alkyl groups having from three to eleven carbon atoms, inclusive, and wherein R" is hydrogen.

3. A compound having the formula:

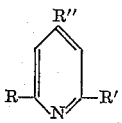

wherein R and R' are tertiary-alkyl groups having from three to eleven carbon atoms, and wherein R" is hydrogen.

4. 2,6-diisopropylpyridine.
5. 2-isopropyl-6-tertiary-butylpyridine.
6. 2,6-di-tertiary-butylpyridine.
7. 4-methyl-2,6-di-tertiary-butylpyridine.

References Cited in the file of this patent

Bergmann et al.: Chem. Abst., vol. 45, col. 4241 (1951).

Oparina: J. Russ. Phys. Chem. Soc., vol. 57, pp. 319–41, abstracted in Chem. Abst., vol. 20, p. 2499(4) 1925.

Beilstein: Handbook of Org. Chem., vol. 20, 2nd Supp., pp. 167–69, Springer-Verlag 1953.

Maier-Bode et al.: Pyridine and Its Derivatives, p. 60 (1934).